UNITED STATES PATENT OFFICE 2,522,057

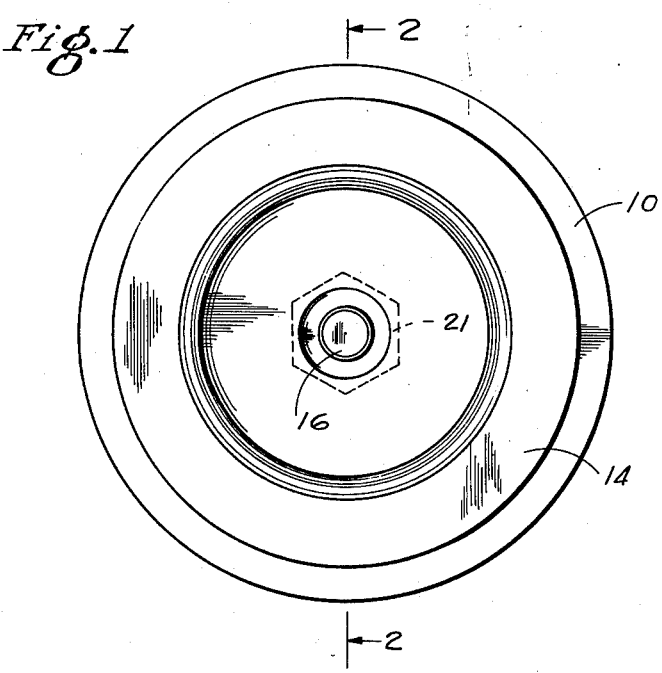
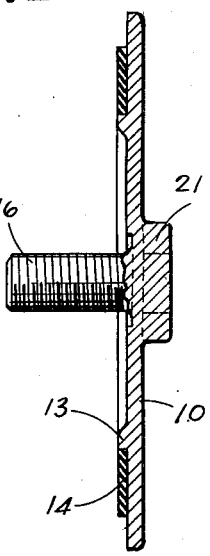
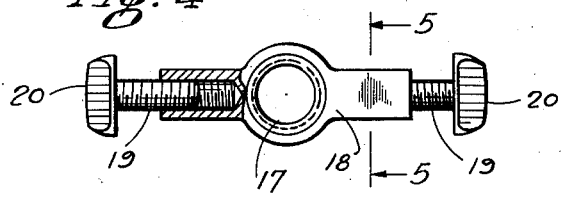
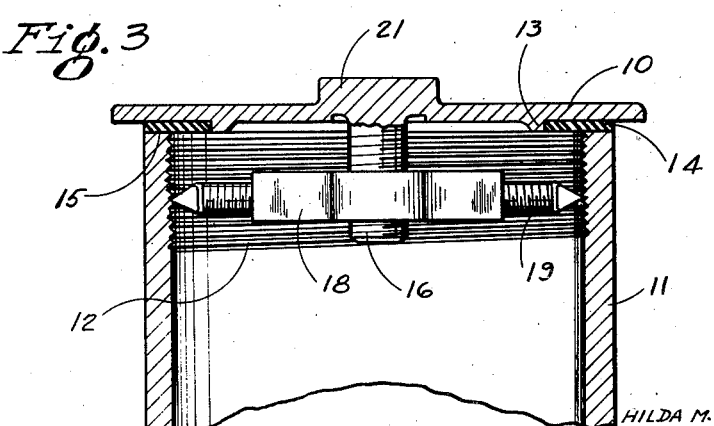
INVENTOR.
HILDA M. OWENS, ADMINISTRATRIX
OF PAUL C. OWENS, DECEASED.
ATTORNEYS.

COVER PLATE CONNECTION

Paul C. Owens, deceased, late of Cleveland, Ohio, by Hilda M. Owens, administratrix, Cleveland, Ohio Application February 23, 1946, Serial No. 649,648

1 Claim. (Cl. 138—89)

This invention relates broadly to closures for conduits and more specifically to improvements in cover plates for risers or stand pipes used in conjunction with plumbing goods commercially known in the trade as clean outs or drum traps.

In the building art it is customary to provide a clean out trap in such pipe lines as communicate with the soil pipes or sewer connection and to construct the trap with an opening therein to facilitate the removal of sediment from the interior thereof. The cover plates for the openings in such traps are generally constructed for threaded engagement within a riser which forms a portion of the clean out device, and, as a rule, these plates are made of a rust resisting metal so as to facilitate the ready removal of the plate in the event the iron pipe riser should become rusted. Despite such construction it is seldom possible to remove the plate from the riser without deformation of the pipe or mutilation of the threads therein.

Inasmuch as the manufacturers of plumbers' supplies have never seen fit to standardize the thread or conduit size of the trap risers it is frequently difficult to find a plate which may be used as a renewal part, particularly when the plumbing installation is of old standing at the time the new plate is required.

The present invention contemplates a cover plate which may be used as an initial installation member or as a replacement part for risers which have been mutilated or deformed and, in addition, a plate which may be used on pipes and conduits of different size and/or risers formed with different pitch threads therein.

In addition to the foregoing objects the invention further contemplates a cover plate which is constructed to provide an effective seal between the plate and the end of the riser, a device which is constructed to withstand repeated removal and assembly and a structure which is sturdy, durable and economic of manufacture.

Other objects and advantages more or less ancillary to the foregoing and the manner in which all the various objects are realized will appear in the following description.

Referring to the drawings wherein the preferred embodiment of the invention is illustrated:

Fig. 1 is a plan view of the lower face of the improved cover plate which embodies the present invention;

Fig. 2 is a vertical section through the plate illustrated in Fig. 1, the section being taken on the plane indicated by the line 2—2 in Fig. 1;

Fig. 3 is a vertical section through a fragmentary portion of a trap riser and the cover plate including, in elevation, the jack screw employed to retain the cover plate in assembled relation upon the riser;

Fig. 4 is a plan view of the jack screw, shown in Fig. 3, a portion of the frame member thereof being shown in section; and Fig. 5 is a transverse section through a portion of the jack screw shown in Fig. 4, the section being taken on a plane indicated by the line 5—5 in Fig. 4.

Referring first to Fig. 3, the cover plate 10 is mounted upon the end of a trap riser 11 of the type which is formed with an internal thread 12 in the end portion thereof. The cover plate embodying the present invention is constructed with an annular rib 13 on the lower face thereof which constitutes a pilot bearing for a resilient gasket 14, preferably cemented to a machined surface 15 extending from the rib to the peripheral edge of the plate. In the central portion of the plate there is a stem 16 machined for screw threaded engagement within a tapped hole 17 formed in the body of a frame 18 having right and left threaded jack screws 19 mounted therein. The ends of the screws 19 are formed with heads 20 which are tapered for engagement with the root of the riser threads 12 and of suitable width to restrain the screws from rotation when the frame is revolved about the axis of the screws in the manner employed in making an adjustment on a turn buckle. The end portions of the frame 18 are preferably of rectangular cross section in order to facilitate the use of a wrench in tightening the jack screw assembly within the riser or conduit and the upper face of the plate 10 may be formed with a boss 21 or a recess configured to accommodate the use of a wrench to revolve the plate when drawing the screw 16 down in the tapped hole 17 in the frame.

The application of the improved cover plate upon a conduit is effected by first adjusting the jack screw assembly within the riser with the knife edges of the heads of the screws seated within the threads of the riser. The frame member 18 is then rotated about the axis of the screws to effect the distention thereof and the consequent rigid securement of the jack screw assembly within the riser. In this operation a wrench may be employed either upon the rectangular end portions of the frame or about the enlarged central portion thereof in order to assure the impinged securement of the screws within the riser. When the jack screw assembly is thus mounted in the conduit with the axis of the tapped hole 17 in the frame in aligned relation with the axis of the conduit, the threaded stem 16 of the cover plate is inserted into the opening 17 and the plate revolved until the gasket 14 is tightly impinged against the end portion of the conduit or riser 11.

It will be recognized that a cover plate of this character may be used upon risers, pipes or conduits which vary through an appreciable range of size and that the jack screw assembly may be effectively mounted in conduits which are out of round, conduits in which the threads have been mutilated or in which no thread has been cut, moreover, that the organization of the plate, gasket and clamping screw will assure an effective seal irrespective the repeated removal and replacement of the assembly.

Although the foregoing description is necessarily of a detailed character, in order that the invention may be completely set forth, it is to be understood that the specific terminology is not intended to be restrictive or confining and that various rearrangements of parts and modifications of detail may be resorted to without departing from the scope or spirit of the invention as herein claimed.

What is claimed is:

A closure mechanism for conduits comprising an imperforate closure plate formed to overlie the end of an internally threaded conduit, means on the underside of said plate for sealing engagement with the end of the conduit, and mounting means for clamping said plate in sealing relationship with the end of the conduit, said mounting means comprising a turnbuckle including a pair of diametrically opposed oppositely threaded radial clamp screws, said clamp screws having blade-like free end portions formed to engage the threaded inner wall of said conduit and prevent rotation of said screws relative to the conduit, an axially threaded central bore in the body of said turnbuckle, a threaded stem non-rotatably attached to and depending from said plate and disposed in said bore, and tool-receiving means formed on the outer side of said plate to facilitate turning of the plate and stem relative to said mounting means, whereby rotation of said closure plate by a tool applied to said tool-receiving means simultaneously urges said closure plate against an associated conduit and tends to wipe foreign material from between the zone of engagement of the closure with the conduit.

HILDA M. OWENS,
*Administratrix of Paul C. Owens, Deceased.*

REFERENCES CITED

The following references are of record in the file of this patent:

UNITED STATES PATENTS

| Number | Name | Date |
|---|---|---|
| 587,274 | Rue | July 27, 1894 |
| 2,226,233 | Shapiro | Dec. 24, 1940 |
| 2,238,710 | Shapiro | Apr. 15, 1941 |